US005488896A

United States Patent [19]

Current

[11] Patent Number: 5,488,896

[45] Date of Patent: Feb. 6, 1996

[54] SELF ALIGNING PISTON ROD

[75] Inventor: Andrew Current, Oglesby, Ill.

[73] Assignee: Schlage Lock Company, San Francisco, Calif.

[21] Appl. No.: 362,821

[22] Filed: Dec. 22, 1994

[51] Int. Cl.[6] .......... F16J 1/10

[52] U.S. Cl. .......... 92/129; 92/143

[58] Field of Search .......... 92/129, 80, 82, 92/143; 91/4 R; 60/400, 401

[56] References Cited

U.S. PATENT DOCUMENTS

| | | | |
|---|---|---|---|
| 2,675,677 | 4/1954 | Aikman | 91/4 |
| 2,881,705 | 4/1959 | Staege | 92/129 X |
| 3,880,054 | 4/1975 | Domyan | 92/129 |

FOREIGN PATENT DOCUMENTS

| | | | |
|---|---|---|---|
| 1091883 | 10/1960 | Germany | 92/129 |

*Primary Examiner*—John E. Ryznic
*Attorney, Agent, or Firm*—Robert F. Palermo

[57] ABSTRACT

A power actuated door operator for opening and closing a door has a power inlet into a cylindrical body containing a power piston, a hydraulic door closer piston with a rack gear for engaging with a pinion gear for operating a door control arm, a head separating the power piston in a chamber from the hydraulic door closer piston in a hydraulic chamber, a reciprocable rod extending through an opening in the head for transmitting pushing forces between the power piston and hydraulic door closer piston, and a spring for pushing the hydraulic piston to provide closing force to the door control arm after the door has been opened by the door operator, and further has the improvement providing capability for enabling the reciprocable rod to move radially with respect to faces of the power piston and the hydraulic closer piston to accommodate misalignments between the pistons, the rod, and the opening in the head.

5 Claims, 2 Drawing Sheets

SELF ALIGNING PISTON ROD

BACKGROUND OF THE INVENTION

This invention relates generally to door closers and more particularly to power actuated door operators having self aligning piston rods for extended service life and improved reliability.

Power actuated hydraulic door operators may have a screw drive to push a hydraulic piston or a pneumatic or hydraulic pump to drive an air or hydraulic piston for displacing the hydraulic piston of the door closer portion of the door operator. In either case, the hydraulic fluid filled cylinder chamber of the door closer portion and the screw drive, pneumatic drive, or hydraulic drive chamber are separated by a head through which a piston rod projects and reciprocates in order to cause the hydraulic piston of the closer portion to either be driven by the power drive piston during opening or to drive the power drive piston during closing of the door. The head has guide bearings and seals surrounding the reciprocating rod to prevent leakage of fluid or air through the head. Commonly, the rod fits snugly in sockets in the faces of the driving and the driven pistons.

In manufacturing, dimensions, angles, fits, and finishes are specified with practical tolerances which allow for mass production and reasonable pricing. The tolerances are usually specified such that parts made in accordance with them will fit together when assembled and will function as intended. Of course, there is a small probability that the tolerances of the parts chosen for a particular assembly will "stack up" such that fits and alignments will be so bad that the assembly is rejected and either reworked or scrapped. Most of the time, however, the tolerance distribution of parts in the assemblies is within acceptable limits.

over time in service, even if the manufacturing tolerances are virtually perfect, the components of the door operator wear or deform, and slight misalignment between the pistons and the reciprocating rod may occur. As operation continues, this misalignment causes wear of the rod, the guide bearings, and the seals in the head. As a result, leakage of the hydraulic fluid and air begins between the two chambers. This results in degraded performance and, eventually, in complete failure of the door operator.

The foregoing illustrates limitations known to exist in present door operators. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in a power actuated door operator for opening and closing a door, the door operator having a power inlet into a cylindrical body to drive a power piston, a hydraulic door closer piston with a rack gear for engaging with a pinion gear for operating a door control arm, a head separating the power piston in a chamber from the door closer piston in a hydraulic chamber, a reciprocable rod extending through an opening in the head for transmitting pushing forces between the power piston and the door closer piston, and a spring for pushing the door closer piston to provide closing force to the door control arm after the door has been opened by the door operator, the improvement, in combination with the door operator, comprising means for enabling the reciprocable rod to move radially with respect to faces of the power piston and the hydraulic door closer piston to accommodate misalignments between the pistons, the rod, and the opening in the head.

The foregoing and other aspects will become apparent from the following detailed description of the invention when considered in conjunction with the accompanying drawings.

DETAILED DESCRIPTION

Figures 1, 2A, 2B, 2C, 2D:
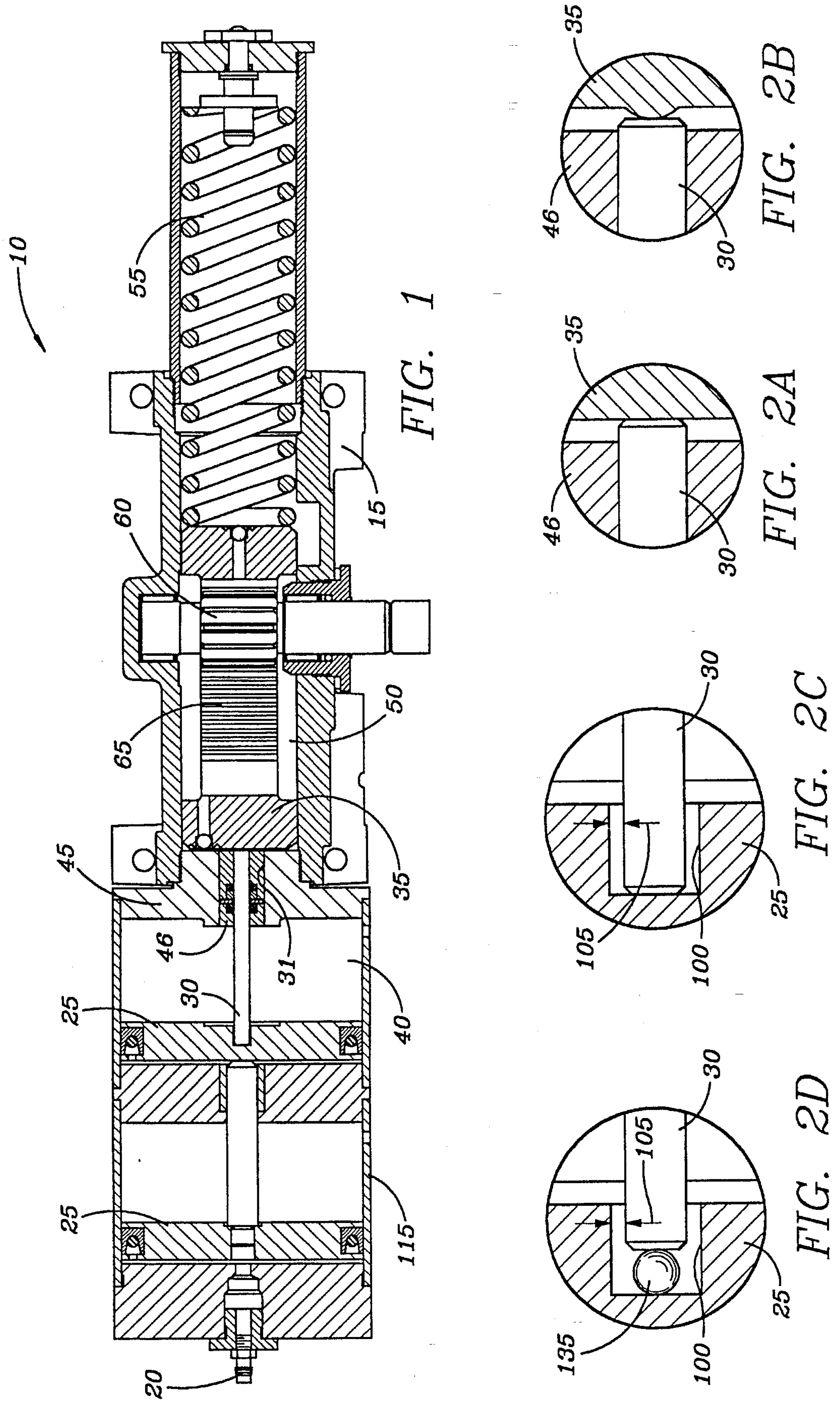
FIG. 1 is a fragmentary cross-sectional schematic elevation view of a fluid actuated embodiment of a door operator of the present invention.
FIGS. 2*a*, 2*b*, 2*c*, and 2*d* are enlarged fragmentary views of alternative embodiments of the present invention.

FIG. 1 shows a fluid actuated power door operator 10 which illustrates the features of the invention. (It has either a pneumatic or hydraulic actuating feature, but for purposes of simplicity, the description of this embodiment will be done in terms of air actuation only.) For air actuation, an air cylinder 115 is mounted on the end of a standard door closer housing 15. The air cylinder has provisions, not shown, for venting air, as appropriate, from either side of air (or power) piston 25. The closer has a housing 15 with a cylindrical hydraulic fluid chamber bore 50, in which a hydraulic door closer piston 35, equipped with a rack gear 65, is free to reciprocate against the bias of a piston return spring 55, which supplies leftward (in the Figure) force to the piston 35 whenever the piston has moved to the right. As the piston moves leftward, pinion 60, which is engaged with rack 65 on the piston, rotates and moves a door control arm (not shown) to close the door to which the door operator is attached in service. Thus, if the door were opened manually, the door control arm would turn the pinion 60 to drive piston 35 rightward against spring 55, after which, the spring would supply closing force as described and drive piston 35 leftward along with rack 65, thereby turning pinion 60 to operate the door control arm and to close the door.

Since the door operator 10, however, is power actuated, the driving and driven members may not be the same as described above. Air cylinder 115 has an air inlet 20, a reciprocable air piston 25, a reciprocable piston rod 30, and a head 45 with an opening 31 through which rod 30 protrudes to maintain contact with the air piston 25 and the hydraulic piston 35. Guide bearing and seal assembly 46 is installed in opening 31 of head 45 to provide sliding support to rod 30 and to seal around the rod to prevent leakage of air into the hydraulic fluid chamber 50 and vice versa.

FIGS. 2*a*–2*d* illustrate four possible contact regimes between the rod 30 and pistons 25 and 35. FIG. 2*a* shows a flat end of the rod 30 projecting out of guide bearing and seal assembly 46 installed in opening 31 of head 45 to make contact with an equally flat face of piston 35. This arrangement is simple, but it has the potential for permitting severe misalignment to occur when rod 30 has pushed piston 35 to the maximum rightward extent unless the rod is held very securely by the guide bearing and seal assembly. FIG. 2*b* shows another contact possibility. Rod 30 extends from the guide bearing and seal assembly 46 in the head and contacts a spherical surface of a bump on piston 35. This arrangement is similar to that of FIG. 2*a*, except that it provides a low friction interface between the rod and the piston as long as both contacting faces are hard. Low friction makes it easier for the rod to self-align, but when fully extended, it has the same weakness as described for FIG. 2*a.*

FIG. 2*c* shows the preferred embodiment of the invention. The piston rod 30 is seen in recess 100 in air piston 25. Note that in all cases the contacting surfaces of the pistons and the rod are perpendicular to the axis of each member. The side clearance 105 between rod 30 and recess 100 is sufficient to permit self-alignment of the rod 30 in response to misalignments of the pistons. The support of the guide bearing and seal assembly together with the clearance 105 between the piston recess 100 and the rod 30, preferably in both pistons, facilitates self-alignment of the rod. FIG. 2*d* is identical to FIG. 2*c* except for the interposing of bearing 135 between the end of rod 30 and the piston 25 in recess 100. The side clearance 105 is the same, but the interface is now anti-friction and self alignment is further facilitated. Clearly it would be most effective to use recesses 100 on both pistons and to incorporate the bearing in at least one of the recesses.

Figure 3:
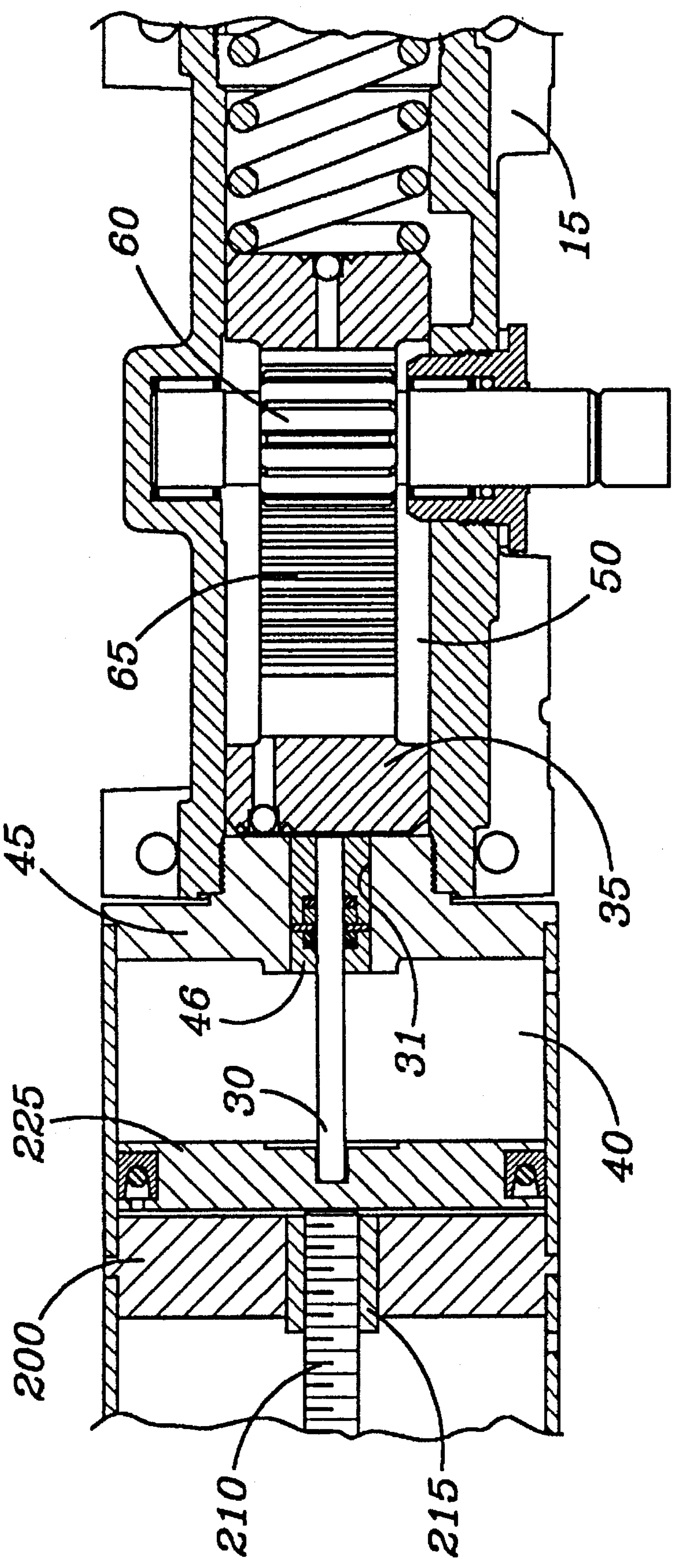
FIG. 3 is a fragmentary cross-sectional schematic view of a mechanical screw actuated embodiment of the door operator of the present invention.

FIG. 3 shows the leftward portion of the door operator of FIG. 1 to illustrate the screw drive embodiment. Except for the screw drive illustrated (in this case, an acme screw), all features of the door operator are identical to those previously described. In this case, head 200 has a captured threaded collar 215 in which a threaded screw 210 is engaged to cause a piston 225 to reciprocate in response to a rotary driving force on screw 210. (The power source of the rotary force is not shown, but it could be any of a number of devices commonly employed for such purposes.) When screw 210 pushes piston 225 rightward in the Figure, the piston 225 pushes rod 30, which extends through head 45 to push piston 35.

To anyone skilled in the art, it will be clear that there are a number of equivalent ways to actuate the door operator to drive piston 35 rightward to open a door. The floating piston rod 30 of this invention makes such power actuated door operators more durable and less susceptible to jamming. The ability of rod 30 to self-align with the piston heads allows the operators to work more smoothly, to consume less energy, and to produce less wear and tear in operation.

What is claimed is:

1. In a power actuated door operator for opening and closing a door, said door operator having a power inlet into a cylindrical body to drive a power piston, a hydraulic door closer piston with a rack gear for engaging with a pinion gear for operating a door control arm, a head separating said power piston in a chamber from said hydraulic door closer piston in a hydraulic chamber, a reciprocable rod extending through an opening in said head for transmitting pushing forces between said power piston and said hydraulic piston, and a spring for pushing said hydraulic door closer piston to provide closing force to said door control arm after said door has been opened by the door operator, the improvement, in combination with said door operator, comprising:

means for enabling said reciprocable rod to move radially with respect to faces of said power piston and said hydraulic door closer piston to accommodate misalignments between said pistons, said rod, and the opening in said head.

2. The combination of claim 1, wherein the means for enabling said reciprocable rod to move radially with respect to faces of said power piston and said hydraulic door closer piston comprises a recess in the face of at least one of the pistons, in which recess the rod rests against the piston, said rod having sufficient radial clearance in said recess to allow for radial movement to accommodate misalignments.

3. The combination of claim 2, wherein the means for enabling said reciprocable rod to move radially with respect to faces of said power piston and said hydraulic door closer piston further comprises bearing means, disposed between contacting faces of said rod and at least one of said pistons, for facilitating self-alignment of the rod.

4. The combination of claim 2, wherein the reciprocable rod and the recess are both cylindrical.

5. The combination of claim 3, wherein the reciprocable rod and the recess are both cylindrical.

* * * * *